Sept. 15, 1931. A. E. HEDGES 1,823,449
LIFTING APPARATUS FOR MOTOR CARS OR OTHER VEHICLES
Filed May 9, 1930 2 Sheets-Sheet 1
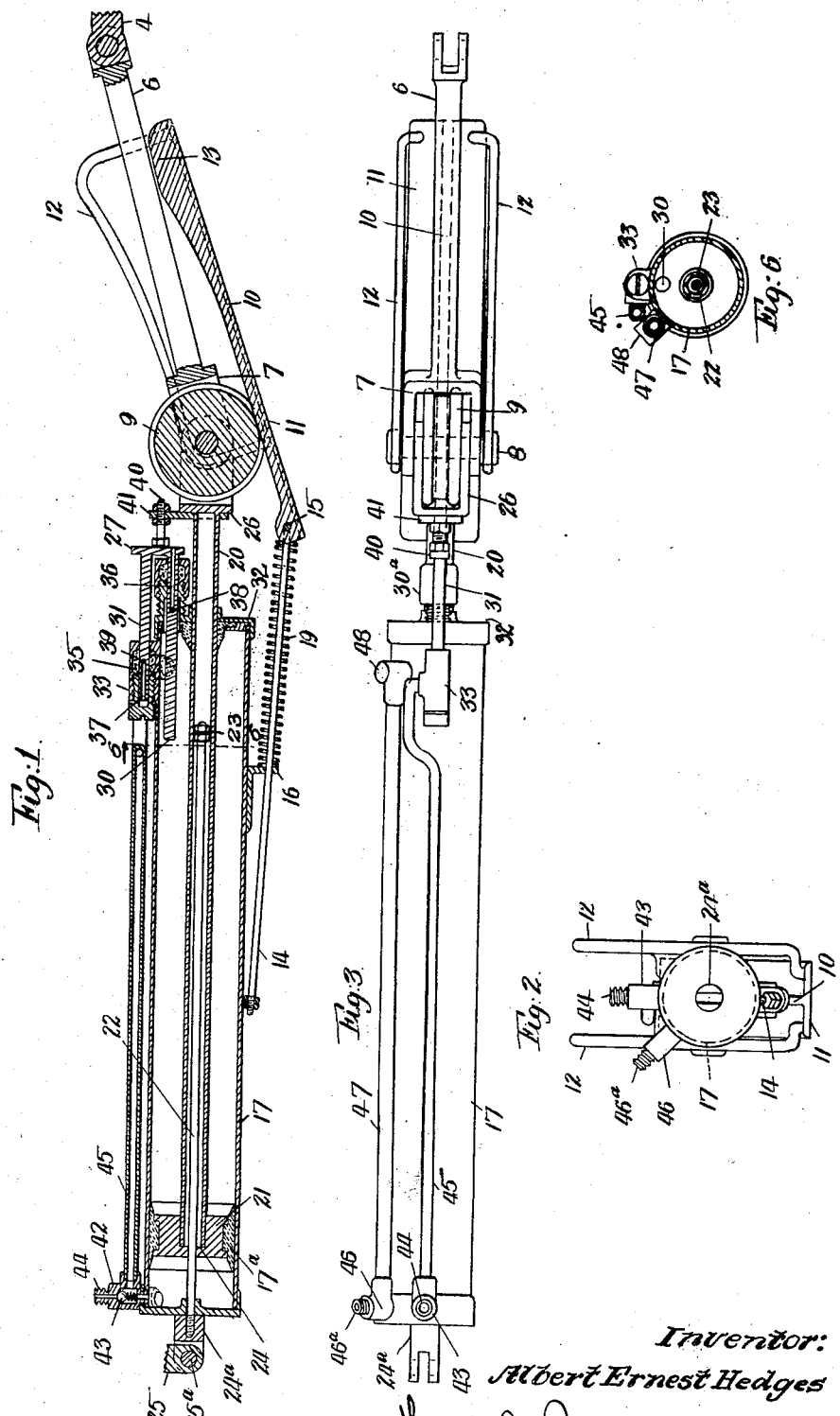
Inventor:
Albert Ernest Hedges
Harold D. Penney
Atty.

Sept. 15, 1931.    A. E. HEDGES    1,823,449
LIFTING APPARATUS FOR MOTOR CARS OR OTHER VEHICLES
Filed May 9, 1930    2 Sheets-Sheet 2
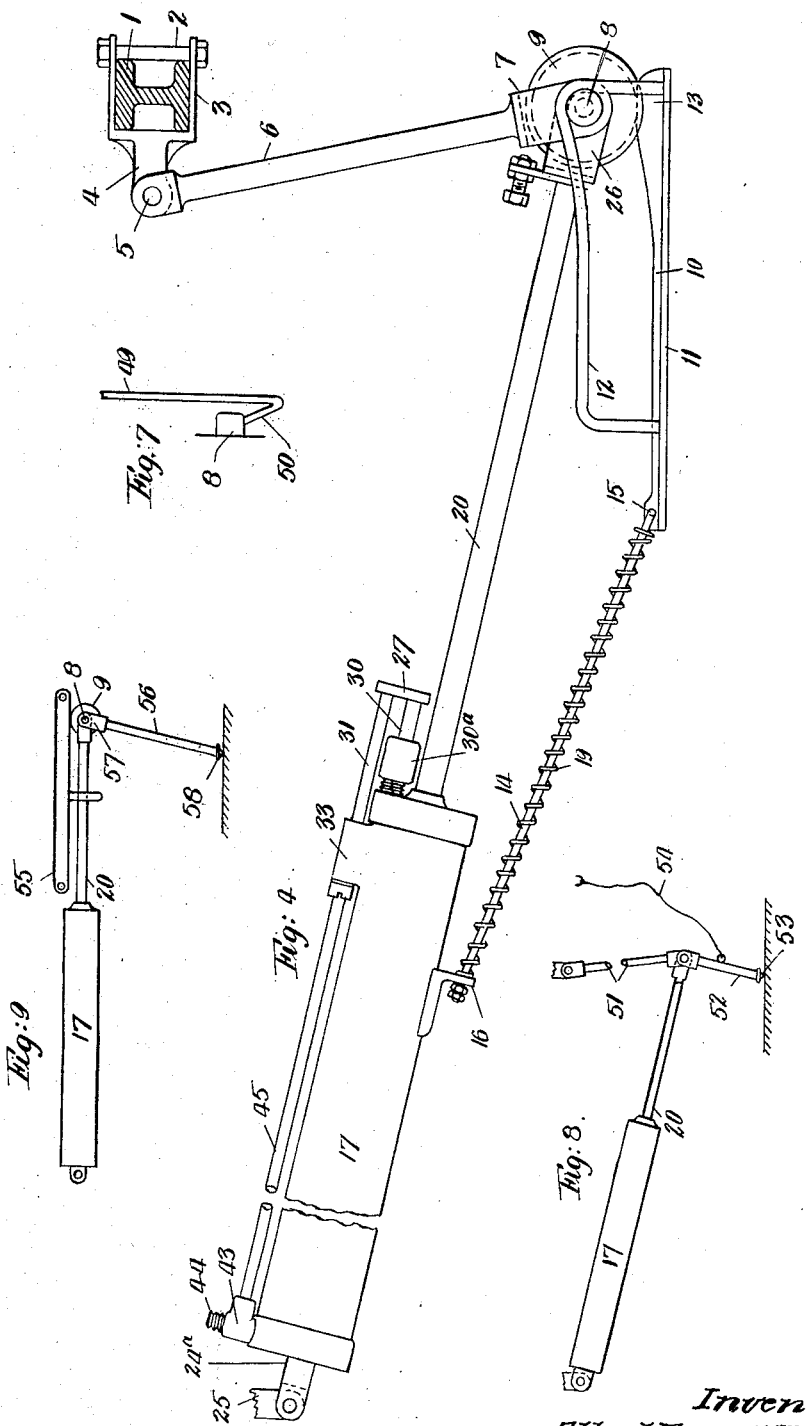
Inventor:
Albert Ernest Hedges
Harold D. Penney  Atty.

Patented Sept. 15, 1931

1,823,449

UNITED STATES PATENT OFFICE

ALBERT ERNEST HEDGES, OF TAUNTON, ENGLAND

LIFTING APPARATUS FOR MOTOR CARS OR OTHER VEHICLES

Application filed May 9, 1930, Serial No. 450,962, and in Great Britain February 14, 1930.

This invention relates to jacking apparatus for motor cars or other vehicles, and it has for its object to provide simple and efficient means, whereby a vehicle may be readily raised so that one or more of the wheels are free of the ground.

According to this invention, a cylinder or cylinders are provided which are pivotally connected at one end to the frame or other convenient part of the vehicle. Disposed within each cylinder is a piston or plunger, the end of said plunger or the piston rod, as the case may be, projecting beyond the end of the cylinder and having pivotally connected to it, one end of an arm or link, the opposite end of which is pivotally supported from the axle of the vehicle or other convenient part. The arm just referred to, carries at that end to which the aforesaid plunger or piston rod is connected, a roller or wheel. Provision is made whereby compressed air, steam, or a liquid under pressure may be admitted to either end of the cylinder to operate the piston or plunger in a manner such that the arm may either be caused to assume a substantially vertical position when the roller contacting with the ground will raise the vehicle or to cause the said arm to assume a position where the roller is clear of the ground.

The compressed air for operating the plunger or piston may be obtained from any suitable source, as for example, from a pump operated by the engine and such as already in use for inflating the pneumatic tires of vehicles.

In order that the invention may be the better understood drawings are appended illustrating a form of device according to this invention in which:—

Fig. 1 is a longitudinal section.
Fig. 2 is an end view.
Fig. 3 is a plan.
Fig. 4 is a side view showing the parts in their effective positions.
Fig. 5 is a sectional view showing certain details.
Fig. 6 is a cross sectional view, on the line 6—6 of Fig. 1.
Fig. 7 is a view showing means for supporting the parts in their out of use position.
Figs. 8 and 9 are diagrammatic views showing modified arrangements.

Referring to the accompanying drawings, 1 indicates the front axle of a vehicle to which is secured by means of a bolt 2, a U shaped clamp 3 carrying a bearing 4 for a pin 5 whereby there is pivotally connected to said bracket one end of a rod 6, the opposite end of which 7 is forked as shown and carries a pin 8 upon which is mounted a roller 9 having its periphery recessed at 9$^a$ to engage a track 10 carried by a plate 11 which, when the parts are in their effective position as shown in Fig. 4, engages the ground, raising the axle 1. The pin 8 at its ends engages tracks or guides 12 of suitable outline to permit the roller 9 to run upon the track 10 which it will be noted at its forward end terminates in an upwardly projecting portion 13. The guides 12 also serve to maintain the roller 9 in contact with the said track 10. 14 indicates a rod pivotally connected at its end 15 to the inner end of the plate 11, said rod passing through an eye 16 secured to the cylinder 17, hereafter more fully described, the withdrawal of the rod from the eye being prevented by means of the lock nuts 18 upon the inner end of said rod. 19 indicates a helical spring encircling the rod 14 and abutting at its ends respectively against the inner surface of the eye and the end of the plate 11. The spring 19, as will be hereafter more fully explained, acts to force the plate 11 outwards. 20 indicates a hollow piston rod having at one end a piston 21, slidable in the aforesaid cylinder 17, said piston preferably being recessed, as shown, to contain bucket leathers indicated by 17$^a$.

Disposed within the hollow piston rod 20 is a rod 22 having upon its inner end a stop, which in the example illustrated, is comprised of lock nuts 23, but said stop may be in any other convenient form. The nuts 23 serve to limit the outward movement of the piston 21 by contacting with the bottom of the recess 24 in the said piston and in which recess the inner end of the piston rod is secured.

The rod 22 passes through the end of the cylinder 17 and is attached to a nut 24ª disposed upon the outside of the said cylinder, and which nut is extended and slotted to receive a bracket 25, of which only a part is shown and which bracket is attached to the floor of the car, or any other convenient part of the vehicle. A pin 25ª serves to pivotally connect the nut to the bracket in a manner such that the cylinder 17 is free to swing in the vertical plane.

The forward or outer end of the piston rod is provided with a forked head 26 the limbs of which are perforated to engage the aforesaid pin 8, said limbs being respectively disposed within the limbs of the forked head of rod 6.

Disposed at the forward or outer end of the cylinder 17 and disposed at a right angle to the length thereof, is a plate 27 having formed integrally therewith two pins 30, 31 disposed in suitable parallel spaced relationship, the pin 30 passing through a stuffing box and gland 30ª upon the cylinder cover 32 into the interior of the cylinder 17, as shown in Fig. 1.

The second pin 31 passes through the end of a small box or chest 33, suitably packed at one end at 35. The pins 30, 31 form valves for which purpose pin 30 is bored from its outer end for a certain distance inwards, and the pin 31 is bored for a certain distance from its inner end, these bores or passages being indicated respectively by 36 and 37, and communicating respectively with each bore in a transverse passage 38, 39. As the piston moves outwards at the ends of its stroke it contacts with the inner end of the pin 30 moving it, together with the pin 31, outwards. The return movement of the pins 30, 31 is effected by means of an adjustable tappet 40 carried by a plate 41 mounted upon the piston rod 20. The compressed fluid for causing the outward movement of the piston is admitted into the cylinder through a non-return valve 42 disposed in a casing 43, said casing having a connection 44 for the attachment of the pipe supplying the operating fluid. Connected to the casing just referred to, on the cylinder side of the valve, is one end of a pipe 45, the opposite end of which is connected to the aforesaid chest 33, the arrangement being such that when the pin 31 is moved into its outermost position by the piston acting on the pin 30, as the said piston reaches the outer end of its stroke, the transverse port 39 will be moved out of the chest placing the cylinder behind the piston open to the atmosphere.

The forward movement of the pin 30 during this period causes its transverse port 38 to be moved into a position where it is closed by the packing of the stuffing box 30ª, thus closing the forward end of the cylinder to the atmosphere to permit the operating fluid to be effectively passed thereto through a non-return valve disposed within a casing 46, having a connection 46ª for the pipe supplying the operating fluid and supported upon the inner end of the cylinder 17 and connected through a pipe 47 and elbow 48 to the said forward end.

As the piston moves into its innermost position, the adjustable tappet 40 effects the return movement of the pins 30, 31 thus causing the inner end of the cylinder to be again closed to atmosphere, as shown in Figure 5, and the transverse port 38 of pin 30 to be moved into a position where it is in communication with the forward end of the cylinder to open same to the atmosphere as shown in Fig. 1.

Upon the forward movement of the piston the plate 11 will be pushed forward by the spring 19, the roller remaining at the inner end of plate 11 until such time as the said plate contacts with the ground when the said roller will move along the track 10 until it reaches the outer end and its further movement is checked by the lock nuts 23 upon the rod 22, which as previously stated, serve to limit the outward movement of the said piston, the length of forward stroke of which is sufficient to cause the rod 6 to be moved beyond the vertical position in order that the reaction due to the weight of the raised vehicle shall be mainly exerted in the form of a thrust along this last mentioned rod.

The return movement of the piston causes the roller to travel backwards over track 10 until it reaches the inner end of the guides 12 when it acts to raise the plate 11 returning it to the position shown in Figure 1.

The supply of the operating fluid is controlled by means of a two-way cock.

Provision may be made for holding the parts in their raised position and such means may comprise a depending plate 49 having its lower end bent backwards and upwards, as shown at 50 Figure 7, said upwardly turned part 50 engaging the projecting end of the pin 8 of roller 9, the pressure upon the parts when operated pushes the pin 8 clear of the part 50.

According to the modified arrangement shown diagrammatically in Figure 8, instead of the piston rod being provided with the above described roller 9, and its associated parts, the said piston rod may at its outer end be connected to what is in effect a pair of toggle levers indicated by 51 and 52, the upper extremity of the lever 51 being pivoted to any suitable part of the underneath of the vehicle and the lower end of the lever 52 being provided with a spiked extremity 53 designed to engage with the ground as the piston moves into its outermost position, any suitable means, such for instance, as a chain or length of cable 54, may be connected between the lever 52 and the underside of the vehicle whereby, when the piston moves inwards, this lever becomes raised out of contact with the ground.

In the modified arrangement shown in Fig. 9, the cylinder 17 is permanently maintained in a horizontal position and the roller 9 is caused to traverse a body or track 55 secured to a suitable part of the vehicle and a supporting leg 56 is provided, this leg having a forked upper extremity 57 by means of which it is pivotally mounted upon the pin 8, the leg at its lower extremity being spiked as shown in 58 so as to engage with the ground as the piston moves into its outermost position, in the manner shown, and whereby the thrust due to the weight of the car is mainly taken by the track 55.

As will be readily understood, in the case where the pump supplying the compressed operating fluid is itself provided with a non-return valve, the non-return valves disposed within the casings 43 and 46 may be dispensed with. It will also be understood that the members 44 and 46a, in practice, are connected to a source of fluid pressure through suitable valve devices, not shown.

Claims:

1. A jack for vehicles comprising a cylinder, means upon the vehicle pivotally supporting one end of said cylinder, a piston, a piston rod, a roller at the outer end of said piston rod, a plate adapted to contact with the ground, means connecting said plate to said piston rod, a track upon said plate engaged by said roller, a rod pivotally connected at one end to the outer end of the piston rod, means pivotally connecting the other end of said rod to the vehicle, means connecting the ends of the cylinder with a source of pressure, valves for controlling the admission and exhaust to the cylinder to operate the piston in one or other direction and means actuated by the piston and piston rod for operating said valves.

2. A jack for vehicles comprising a cylinder, means upon the vehicle pivotally supporting one end of said cylinder, a piston, a piston rod, a plate adapted to contact with the ground, a pin carried by said piston rod, a roller upon said pin a plate adapted to contact with the ground, a track on said plate engaged by said roller, guides upon said plate engaging the pin carrying said roller, a rod connected at one end to the plate, a guide for said rod upon the cylinder, a spring encircling said rod and operating to push said plate in a downward direction, a rod pivotally connected at one end to the vehicle, and at the other end to the outer end of the piston rod, means connecting the opposite ends of the cylinder, with a source of pressure, valves for controlling the admission and exhaust to the cylinder to operate the piston in one or other direction and means actuated by the piston and piston rod for operating said valves.

3. A jack for vehicles comprising a cylinder, means upon the vehicle pivotally supporting one end of said cylinder, a piston, a piston rod, a plate adapted to contact with the ground, a pin carried by said piston rod, a roller upon said pin, a plate adapted to contact with the ground, a track on said plate engaged by said roller, guides upon said plate engaging the pin carrying said roller, a rod connected at one end to the plate, a guide for said rod upon the cylinder, a spring encircling said rod and operating to push said plate in a downward direction a rod pivotally connected at one end to the vehicle, and at the other end to the outer end of the piston rod, means connecting the opposite ends of the cylinder with a source of pressure, a valve comprising a rod passing through a stuffing box at the outer end of the cylinder, a longitudinally disposed passage in said rod communicating at its outer end with the atmosphere, a transverse passage communicating with the inner end of said first passage and with the cylinder, a second valve also in the form of a rod, a casing for said valve, a connection in said casing for the supply of power thereto, a passage in the rod running longitudinally and from the inner end thereof, a transverse passage, means connecting said first and second valves, said valves being moved in one or other direction to admit the power to one end of the cylinder and exhaust from the other by contact of the piston with the first rod, and by means carried by the piston rod, and means connected to the end of the cylinder remote from the valves for supplying power thereto.

4. A jack for vehicles, comprising a cylinder, means upon the vehicle pivotally supporting one end of said cylinder, a piston, a piston rod, a plate adapted to contact with the ground, a pin carried by said piston rod, a roller upon said pin, a plate adapted to contact with the ground, a track on said plate engaged by said roller, guides upon said plate engaging the pin carrying said roller, a rod connected at one end to the plate, a guide for said rod upon the cylinder, a spring encircling said rod and operating to push said plate in a downward direction, a rod pivotally connected at one end to the vehicle and at the other end to the outer end of the piston rod, means connecting the opposite ends of the cylinder with a source of pressure, a valve comprising a rod passing through a stuffing box at the outer end of the cylinder, a longitudinally disposed passage in said rod communicating at its outer end with the atmosphere, a transverse passage communicating with the inner end of said first passage and with the cylinder, a second valve also in the form of a rod, a casing for said valve, a connection on said casing for the supply of power thereto, a passage in the rod running longitudinally and from the inner end thereof, a transverse passage, means connecting said first and second valves, said valves being moved in one or other direction to admit the power to one end of the cylinder and exhaust from the other by contact of the piston with the first rod and by means carried by the piston rod, and means connected to the end of the cylinder remote from the valves for supplying power thereto, and a non-return valve interposed between said connection and the admission to the cylinder, 5. A jack for vehicles comprising a cylinder, means upon said vehicle pivotally supporting one end of the cylinder, a piston, a piston rod, a plate member having a track thereon and adapted to engage the ground, means connecting said ground engaging plate member to said piston rod, a rod connected to said piston rod and to the vehicle, means for admitting a fluid under pressure to the cylinder to move the piston in one or other direction, means for controlling the admission and exhaust of said fluid, and means in rolling contact with said track on said plate member and operable by said piston rod for operating said rod connected to said vehicle for raising the same.

6. A jack for vehicles, comprising a cylinder; a piston rod therein; a ground bearing member; a rolling member; means for holding said rolling member in constant contact with the ground bearing member; a connection between the rolling member and said vehicle; means for supporting the parts in an elevated position, and means actuated by the operation of said piston rod for lowering the ground bearing member to the ground and for urging said roller member forward over said ground bearing member for raising said vehicle.

In testimony whereof I have hereunto set my hand.

ALBERT ERNEST HEDGES.